(12) United States Patent
Blank et al.

(10) Patent No.: US 8,868,454 B1
(45) Date of Patent: Oct. 21, 2014

(54) METHOD AND SYSTEM FOR PROVIDING RAPID ACCESS TO TAX REFUND MONEY

(75) Inventors: Bennett R. Blank, San Diego, CA (US); Roy Matthew Rosin, Wayne, PA (US); Richard Preece, San Diego, CA (US); Christopher Womack, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 16 days.

(21) Appl. No.: 13/193,423

(22) Filed: Jul. 28, 2011

(51) Int. Cl.
*G06Q 40/00* (2012.01)
*G06Q 20/10* (2012.01)

(52) U.S. Cl.
CPC .......... *G06Q 40/123* (2013.01); *G06Q 20/1085* (2013.01)
USPC ......................................................... 705/31

(58) Field of Classification Search
CPC ... G06Q 40/123; G06Q 40/02; G06Q 20/207; G06Q 20/1085
USPC ......................................................... 705/31
See application file for complete search history.

(56) References Cited

U.S. PATENT DOCUMENTS

| 8,185,457 | B1 | 5/2012 | Bear et al. | |
|---|---|---|---|---|
| 2005/0086168 | A1* | 4/2005 | Alvarez et al. | 705/41 |
| 2005/0125360 | A1 | 6/2005 | Tidwell et al. | |
| 2006/0271496 | A1 | 11/2006 | Balasubramanian et al. | |
| 2009/0112761 | A1 | 4/2009 | Robertson et al. | |
| 2009/0292569 | A1 | 11/2009 | Statland et al. | |
| 2010/0293079 | A1* | 11/2010 | Wilson et al. | 705/31 |
| 2012/0203572 | A1 | 8/2012 | Christensen | |

OTHER PUBLICATIONS

Blank et al., "Method and System for Converting Printed Checks into Pre-Paid Debit Card Funds," U.S. Appl. No. 13/193,401, filed Jul. 28, 2011.

* cited by examiner

*Primary Examiner* — Shay S Glass
(74) *Attorney, Agent, or Firm* — Hawley Troxell Ennis & Hawley LLP; Philip McKay

(57) ABSTRACT

Refund issuing stations that can be accessed by users/taxpayers include a user interface for obtaining user ID data associated with users/taxpayers and a card/cash dispenser for providing the users/taxpayers with a prepaid tax refund debit or credit card, or currency, based on user tax and/or refund data provided by a financial management system used to prepare user's tax returns and tax related documents, and/or file the user's tax returns.

20 Claims, 2 Drawing Sheets

METHOD AND SYSTEM FOR PROVIDING RAPID ACCESS TO TAX REFUND MONEY

BACKGROUND

Many taxpayers who are owed tax refunds not only rely on receiving their tax refunds, but also desire/need to have access to at least part of their tax refund money as soon as possible. However, it can take many government agencies, including the Internal Revenue Service and state tax agencies, weeks, or even months, to process a taxpayer's tax return, generate a tax refund check/deposit data, and then mail/deposit the tax refund.

Currently, a taxpayer who cannot, or does not want to, wait weeks, or months, for their tax refund money must obtain a tax refund loan. Tax refund loans are typically provided, or arranged, by/through large tax preparation service providers. Typically, a tax refund loan is just what the name implies, a short-term loan that is provided based on using the expected tax refund check/funds as collateral. In most cases, these tax refund loans are provided to the taxpayer in exchange for both a significant loan initiation fee and a relatively high annual percentage rate incurred until the tax refund check is received.

These currently available tax refund loans have several disadvantages. First, since those taxpayers needing their tax refund money badly enough to accept the burdensome terms of tax refund loans are likely to be those taxpayers in most need of the funds, it is arguable that the current tax refund loan system takes advantage of those taxpayers who can least afford to pay loan initiation fees and high annual percentage rates. Consequently, currently, it is often the case that those in most need of the funds must surrender significant portions of these needed funds in order to obtain access to what, in reality, is their money that has already been essentially loaned to the government interest free.

In addition, even when a taxpayer opts to pay the price of a tax refund loan, the loan can still take several days to process and therefore the taxpayer still may not obtain the funds they need quickly enough. In addition, even when the tax refund loans do become available, the taxpayer typically has to either go back to the office of the lending party to obtain a check, wait to receive the check by mail, or wait for funds to be deposited into a bank account associated with the taxpayer. All three of these options become even more problematic for a taxpayer who does not maintain a bank account.

The situation described above is even more problematic when it is realized that many taxpayers who need access to their tax refund money may not actually need access to all their tax refund money, but may only need access to a fraction of the money just to get by until the tax refund check arrives.

As a result of the situation described above, taxpayers currently have no simple or inexpensive way to quickly and conveniently access at least a portion of their tax refund money after filing their tax returns. This situation not only represents a disservice, and significant economic burden, to some taxpayers, but it also inhibits the free flow of commerce and creates unnecessary economic hardship for thousands of people.

SUMMARY

In accordance with one embodiment, a method and system for providing rapid access to tax refund money includes providing one or more refund issuing stations that can be accessed by users/taxpayers, in one embodiment, in relatively public locations. In one embodiment, the refund issuing stations include a user interface for obtaining user ID data associated with users/taxpayers and a card/cash dispenser for providing the users/taxpayers with a prepaid tax refund debit or credit card, or, in one embodiment, cash.

In one embodiment, a financial management system, such as, but not limited to, a computing system implemented or on-line tax preparation system, and/or one or more personal financial managements systems, is provided. In one embodiment, a user/taxpayer, i.e., a user, utilizes the financial management system, at least in part, to prepare the user's tax returns and tax related documents, and/or file the user's tax returns. Consequently, in one embodiment, the financial management system has access to user tax and/or refund data associated with the user.

In one embodiment, the user is provided an expedited refund option through the financial management system. In one embodiment, if the user selects the expedited refund option, the user tax and/or refund data associated with the user is analyzed to determine an expedited tax refund amount to be made available to the user. In various embodiments, the determination regarding the expedited tax refund amount to be made available to the user is made based, at least in part, on the user tax and/or refund data. In various embodiments, the determination regarding the expedited tax refund amount to be made available to the user is made based, at least in part, on the user tax and/or refund data and other financial data associated with the user which, in one embodiment, is obtained from the financial management system, and/or one or more other financial management systems.

In one embodiment, if a determination is made to provide the user an expedited tax refund amount, then the user is assigned a user ID to be used in association with obtaining the expedited tax refund amount at one of the refund issuing stations.

In one embodiment, the user is informed of the decision to provide the expedited tax refund amount and provided instructions regarding the location and use of the refund issuing stations. In one embodiment, the user then selects a specific refund issuing station, enters his or her user ID data into the user interface of the selected refund issuing station, and the user ID data is verified. The selected refund issuing station is then provided expedited refund data associated with the user, including data indicating the determined expedited tax refund amount to be made available to the user, from the financial management system and/or one or more computing systems implementing/providing the financial management system.

In one embodiment, once the user ID data and the expedited refund data associated with the user are verified and provided to the selected refund issuing station, the selected refund issuing station provides the user with either a pre-paid debit or credit card having a balance equal to the determined expedited tax refund amount to be made available to the user or, in one embodiment, the user is provided the determined expedited tax refund amount to be made available to the user in cash.

Using the method and system for providing rapid access to tax refund money, as discussed herein, taxpayers, including non-bank affiliated taxpayers, are provided a simple and inexpensive way to quickly and conveniently access at least a portion of their tax refund money after filing their tax returns. Consequently, using the method and system for providing rapid access to tax refund money, as discussed herein, a significant economic burden, and considerable inconvenience, currently faced by many taxpayers is removed, along with a significant barrier to the flow of commerce.

Figure 1:
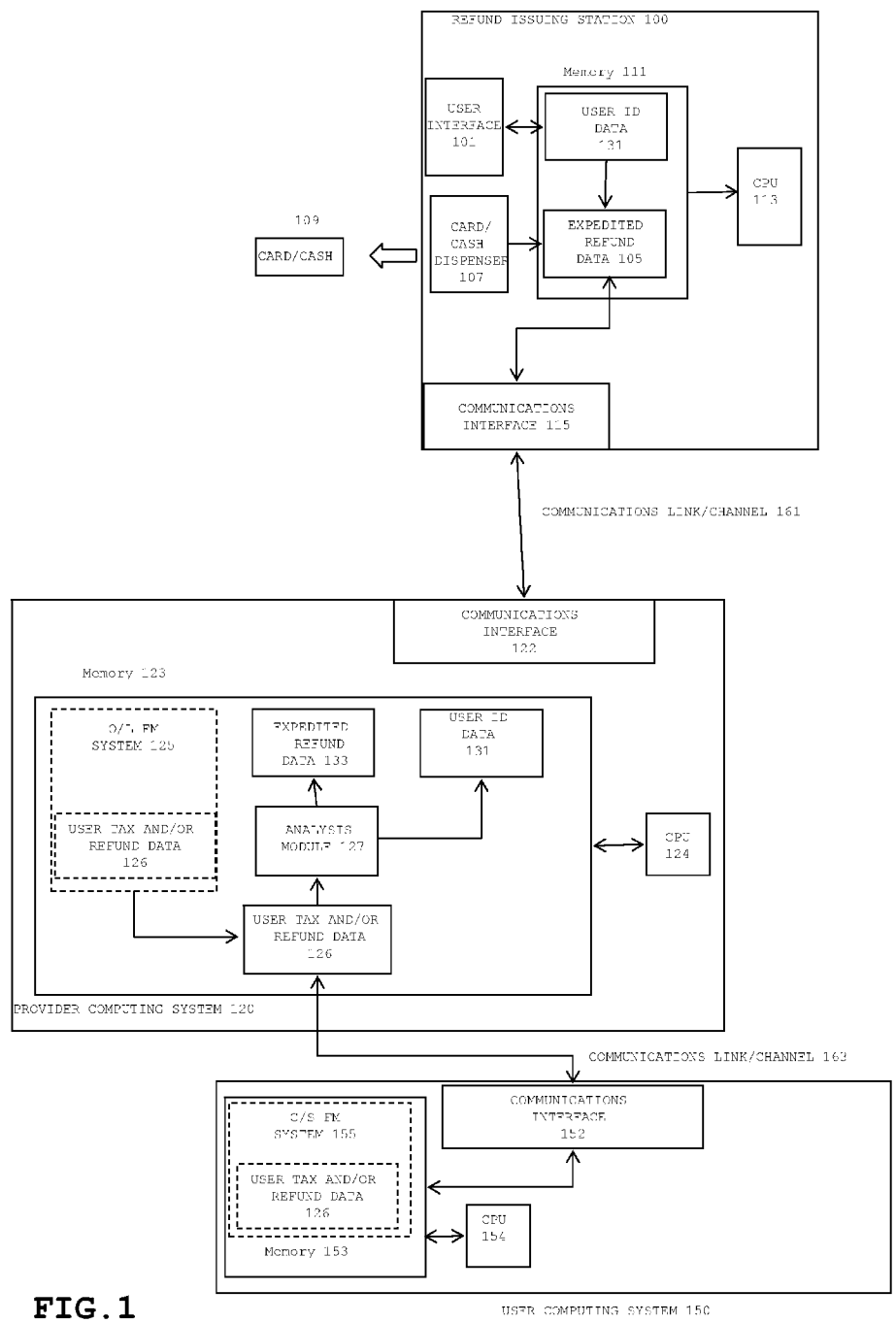
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary features. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms other than those shown and discussed herein and should not be construed as limited to the embodiments set forth herein, shown in the FIGS., and/or described below.

In accordance with one embodiment, a method and system for providing rapid access to tax refund money includes providing one or more refund issuing stations that can be accessed by users/taxpayers. In various embodiments, the one or more refund issuing stations are provided in relatively public locations such as grocery stores, convenience stores, gas stations, banks, or various other publically accessible locations.

In various embodiments, the refund issuing stations are provided as a capability/functionality added to existing systems such as ATM machines, CoinStar™ kiosks, Redbox™ stations, and/or any other service providing stations as discussed herein, and/or as known in the art/available at the time of filing, and or as developed/made available after the time of filing.

In one embodiment, the refund issuing stations include a user interface, such as a user interface screen, and/or one or more user interface devices, such as, but not limited to, a keyboard, a mouse, a touchpad, voice recognition software, or any other mechanism or device for converting user actions into processor instructions and/or computer commands/actions. In one embodiment, the refund issuing station's user interface is used for obtaining/entering user ID data associated with the users.

In one embodiment, the one or more refund issuing stations include a card/cash dispenser for providing the users with a prepaid tax refund debit or credit card, or, in one embodiment, cash.

Herein, the term "pre-paid tax refund debit or credit card" includes any physical or virtual mechanism for providing a purchasing capability as discussed herein, and/or as known in the art/available at the time of filing, and or as developed/made available after the time of filing, and can include, but is not limited to: physical credit or debit cards; smart cards; key chain attachments; memory sticks; data in a memory; a mobile computing system, and/or data maintained by a mobile computing system; or any one of various other means for providing user account data.

In one embodiment, a financial management system, such as, but not limited to, a computing system implemented or on-line tax preparation system, is provided that is a parent system for, is part of, or is otherwise associated with, the method and system for providing rapid access to tax refund money.

As used herein, the term "financial management system" includes, but is not limited to: computing system implemented, and/or online, personal tax preparation systems, packages, programs, modules, or applications; computing system implemented, and/or online, business tax preparation systems, packages, programs, modules, or applications; computing system implemented, and/or online, personal and/or business financial management systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filing or as developed later.

Specific examples of financial management systems include, but are not limited to: TurboTax™, available from Intuit, Inc. of Mountain View, Calif.; TurboTax™ online, available from Intuit, Inc. of Mountain View, Calif.; SnapTax™, available from Intuit, Inc. of Mountain View, Calif.; Quicken™, available from Intuit, Inc. of Mountain View, Calif.; Quicken On-line™, available from Intuit, Inc. of Mountain View, Calif.; QuickBooks™, available from Intuit, Inc. of Mountain View, Calif.; QuickBooks On-line™, available from Intuit, Inc. of Mountain View, Calif.; Mint™, available from Intuit, Inc. of Mountain View, Calif.; Microsoft Money™, previously available from Microsoft, Inc. of Redmond, Wash.; and/or various other financial management systems discussed herein, and/or known to those of skill in the art at the time of filing, and/or as developed after the time of filing.

In one embodiment, a user/taxpayer, i.e., the user, utilizes the financial management system, at least in part, to prepare the user's tax returns and tax related documents, and/or file the user's tax returns. Consequently, in one embodiment, the financial management system has access to user tax and/or refund data associated with the user, and/or various other financial data associated with the user.

In one embodiment, while using the financial management system, the user is provided an expedited refund option through the financial management system, i.e., an offer is made to the user to inquire about obtaining expedited access to at least part of the user's tax refund money.

In one embodiment, the user's financial data associated with the financial management system is provided to one or more processors associated with one or more computing systems and analyzed to determine if the user is to be provided an expedited refund option through the financial management system, i.e., an initial screening is done to determine if the user will be eligible for expedited refund before the user is provided the expedited refund option.

In one embodiment, if the user is provided the expedited refund option, and the user selects the expedited refund option, the user tax and/or refund data associated with the user from the financial management system, such as the user's tax return documents and data, is provided to one or more processors associated with one or more computing systems and analyzed to determine an expedited tax refund amount to be made available to the user.

In one embodiment, the user tax and/or refund data associated with the user from the financial management system, and/or any other financial data associated with the user, is provided to one or more processors associated with the refund issuing station, i.e., processors that are at the same location as, or are part of, the refund issuing station.

In one embodiment, the user tax and/or refund data associated with the user from the financial management system, and/or any other financial data associated with the user, is provided to one or more processors associated with one or more computing systems, such as a provider computing system, that are in a separate location from the refund issuing station.

In various embodiments, the communications link/channel can be, but is not limited to: a mobile communication link, such as a mobile phone link; a land-line phone link; a cable-based communications link; a satellite communications link; the Internet, or other network; and/or any other communications link, or combination of communications links, as discussed herein, and/or as known in the art at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed. As used herein the term "network" also includes, but is not limited to, any mobile communication network.

In various embodiments, the determination regarding the expedited tax refund amount to be made available to the user is made by the one or processors based, at least in part, on the user tax and/or refund data associated with the user from the financial management system, such as the user's tax return documents and data.

In various embodiments, the determination regarding the expedited tax refund amount to be made available to the user is made by the one or processors based, at least in part, on the user tax and/or refund data associated with the user from the financial management system, such as the user's tax return documents and data, and an analysis other financial data associated with the user which, in one embodiment, is obtained from one or more financial management systems.

In various embodiments, the other financial data associated with the user includes, but is not limited to, any one or more of: the user's past tax filing documents and data; the user's financial transaction history; the user's credit worthiness; the user's total worth, etc.

In one embodiment, if a determination is made to provide the user an expedited tax refund amount, then the user is assigned a user ID to be used in association with obtaining the expedited tax refund amount at one of the refund issuing stations.

In various embodiments, the user ID can be, but is not limited to: the user's ID associated/used with the financial management system; an ID or PIN selected by the user; an ID or PIN selected by the provider of the method and system for providing rapid access to tax refund money; or any other form of user ID, as discussed herein, and/or as known/available in the art at the time of filing, and/or as developed/made available after the time of filing.

In one embodiment, the user is informed of the expedited tax refund decision, the expedited tax refund amount to be provided, and the user ID for the user. In one embodiment, the user is also provided instructions regarding the location and use of the refund issuing stations.

In one embodiment, once the user is informed of the expedited tax refund decision, the expedited tax refund amount to be provided, and the user ID for the user, the user selects a specific refund issuing station.

In one embodiment, the user enters his or her user ID data into the user interface of the selected refund issuing station, and the user ID data is verified.

In one embodiment, the refund issuing station then obtains user account data associated with the user and expedited refund data associated with the user, including data indicating the determined expedited tax refund amount to be made available to the user, from the financial management system and/or one or more computing systems implementing/providing the financial management system, and/or from a database accessed via the user ID data.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, the refund issuing station then obtains user account data associated with the user and expedited refund data associated with the user, including data indicating the determined expedited tax refund amount to be made available to the user, from the financial management system and/or one or more computing systems implementing/providing the financial management system, and/or from a database accessed via the user ID data via a communications link/channel.

In one embodiment, once the user ID data and the expedited refund data associated with the user are verified and provided to the selected refund issuing station, the selected refund issuing station provides the user with either a pre-paid debit or credit card having a balance equal to the determined expedited tax refund amount to be made available to the user or, in one embodiment, the user is provided the determined expedited tax refund amount to be made available to the user in cash.

In one embodiment, once the user's tax refund check is received, the balance of the tax refund check amount is also added to the pre-paid debit or credit card balance.

In one embodiment, at the time the funds are made available to the user through the pre-paid tax refund debit or credit card, the user is also provided one or more Card Linked Offers (CLOs) whereby special bonuses, offers, and/or balance additions/multipliers are provided if the user uses the pre-paid tax refund debit or credit card balance in qualifying ways.

For instance, as one illustrative example, in one embodiment, at the time the funds are made available to the user through the pre-paid tax refund debit or credit card, the user is informed that if the user uses the pre-paid tax refund debit or credit card to make specific purchases, or purchases with a defined merchant, the balance on pre-paid tax refund debit or credit card will be increased by 10%.

In some cases, the CLOs will require tracking the user's purchases. In various embodiments, this task can be accomplished using the pre-paid tax refund debit or credit card. In various embodiments, tracking the user's purchases can be accomplished using various merchant point-of-sale systems, or using any mechanism for tracking consumer purchases as discussed herein, known at the time of filing, or as developed thereafter.

Using the method and system for providing rapid access to tax refund money, as discussed herein, taxpayers, including non-bank affiliated taxpayers, are provided a simple and inexpensive way to quickly and conveniently access at least a portion of their tax refund money after filing their tax returns. Consequently, using the method and system for providing rapid access to tax refund money, as discussed herein, a significant economic burden, and considerable inconvenience, currently faced by many taxpayers is removed, along with a significant barrier to the flow of commerce.

Hardware Architecture

FIG. 1 is a block diagram of an exemplary hardware architecture for implementing one embodiment of a system and method for providing rapid access to tax refund money, such as exemplary process 200 (FIG. 2) discussed herein, that, returning to FIG. 1, includes: a refund issuing station 100, e.g., a first computing system; a provider computing system 120, e.g., a second computing system; and a user computing system 150, e.g., a third computing system, all operatively coupled by various communications links 161 and 163.

As used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can include, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In addition, herein, the term "portable computing system" and "mobile computing system" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile computing system and/or mobile device, can include, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As seen in FIG. 1, refund issuing station 100 typically includes: a user interface 101; a card/cash dispenser 107; a central processing unit (CPU) 113; a communications interface 115; and a memory 111.

In one embodiment, one or more refund issuing stations 100 are provided that can be accessed by the user. In various embodiments, one or more refund issuing stations 100 are provided in relatively public locations such as grocery stores, convenience stores, gas stations, banks, or various other publically accessible locations.

In various embodiments, refund issuing stations 100 are provided as a capability/functionality added to existing systems such as ATM machines, CoinStar™ kiosks, Redbox™ stations, and/or any other service providing stations as discussed herein, and/or as known in the art/available at the time of filing, and or as developed/made available after the time of filing.

In one embodiment, user interface 101 includes a user interface screen (not shown) and/or one more user interface devices (not shown), such as, but not limited to, a keyboard, a mouse, a touchpad, voice recognition software, or any other mechanism or device for converting user actions into processor instructions and/or computer commands/actions.

Figure 2:
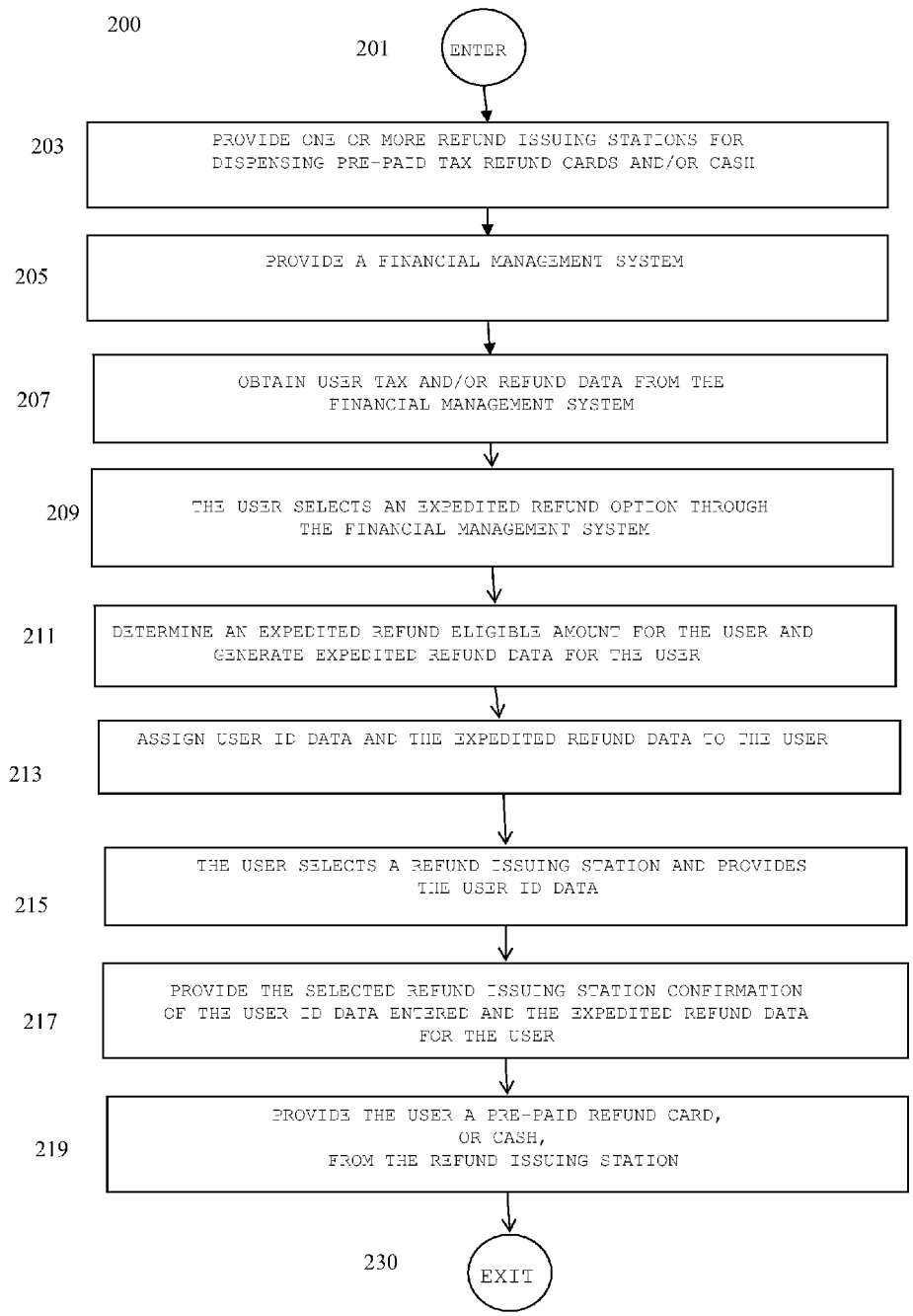
FIG. 2 is a flow chart depicting one embodiment of a process for providing rapid access to tax refund money in accordance with one embodiment.

In one embodiment, user interface 101 is used for obtaining/entering user ID data associated with users of a system and method for providing rapid access to tax refund money, such as exemplary process 200 (FIG. 2).

Returning to FIG. 1, in one embodiment, refund issuing station 100 includes card/cash dispenser 107. In various embodiments, card/cash dispenser 107 is used for providing the users of a system and method for providing rapid access to tax refund money, such as exemplary process 200 (FIG. 2) with a prepaid tax refund debit or credit card, or, in one embodiment, cash.

Herein, the term "pre-paid tax refund debit or credit card" includes any physical or virtual mechanism for providing a purchasing capability as discussed herein, and/or as known in the art/available at the time of filing, and or as developed/made available after the time of filing, and can include, but is not limited to: physical credit or debit cards; smart cards; key chain attachments; memory sticks; data in a memory; a mobile computing system, and/or data maintained by a mobile computing system; or any one of various other means for providing user account data.

In one embodiment, memory 111 includes all, or part, of user ID data 131 and expedited refund data 105.

In various embodiments, user ID data 131 is provided by a user of a system and method for providing rapid access to tax refund money, such as exemplary process 200 (FIG. 2) via user interface 101.

Returning to FIG. 1, in one embodiment, if a determination is made to provide the user an expedited tax refund amount as discussed below, then the user is assigned a user ID, represented by user ID data 131, to be used in association with obtaining the expedited tax refund amount at refund issuing station 100.

In various embodiments, the user ID can be, but is not limited to: the user's ID associated/used with the financial management system; an ID or PIN selected by the user; an ID or PIN selected by the provider of the method and system for providing rapid access to tax refund money; or any other form of user ID, as discussed herein, and/or as known/available in the art at the time of filing, and/or as developed/made available after the time of filing.

In various embodiments, expedited refund data 105 includes user account data associated with the user and expedited refund data associated with the user, including data indicating the determined expedited tax refund amount to be made available to the user.

In one embodiment, expedited refund data 105 is provided to refund issuing station 100, and memory 111, from an online financial management system, such as O/L FM system 125, and/or one or more computing systems, such as provider computing system 120, implementing/providing the financial management system, and/or from a database (not shown) accessed via the user ID data 131.

In one embodiment, expedited refund data 105 is provided to refund issuing station 100, and memory 111, from a computing system implemented financial management system, such as C/S FM system 155, and/or one or more computing systems, such as user computing system 150, implementing/providing the financial management system, and/or from a database (not shown) accessed via the user ID data 131.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

As discussed below, in one embodiment, the user selects refund issuing station 100 and provides refund issuing station's user interface 101 user ID data 131. In one embodiment, at least part of user ID data 131 is provided to one or more processors, such as CPU 113 and/or CPU 124, associated with one or more computing systems, such as refund issuing station 100 or provider computing system 120, for analysis, verification, and/or approval of user ID data 131.

In one embodiment, at least part of user ID data 131 is provided to one or more processors, such as CPU 113, associated with refund issuing station 100, i.e., that are at the same location as refund issuing station 100.

In one embodiment, at least part of user ID data 131 is provided to one or more processors, such as CPU 124, associated with one or more computing systems, such as provider computing system 120, that are in a separate location from refund issuing station 100 and at least part of user ID data 131 is provided by refund issuing station 100, through communication interface 115, to one or more processors, such as CPU 124, associated with one or more remote computing systems, such as provider computing system 120, via a communications link/channel 161, and communication interface 122.

In various embodiments, communications link/channel 161, and/or 163 discussed below, can be, but are not limited to: a mobile communication link, such as a mobile phone link; a land-line phone link; a cable-based communications link; a satellite communications link; the Internet, or other network; and/or any other communications link, or combination of communications links, as discussed herein, and/or as known in the art at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed. As used herein the term "network" also includes, but is not limited to, any mobile communication network.

Refund issuing station 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, refund issuing station 100, whether available or known at the time of filing or as later developed.

In various embodiments, refund issuing station 100 is be any computing system as defined herein and/or as known in the art at the time of filing, and/or as developed thereafter, that includes components that can execute all, or part, of method, system, or process for providing rapid access to tax refund money 200 in accordance with at least one of the embodiments as described herein.

In one embodiment, a financial management system, such as, but not limited to: an on-line financial management system, such as O/L FM system 125; and/or a computing system implemented financial management system, such as C/S FM system 155, is provided that is a parent system for, is part of, or is otherwise associated with the method and system for providing rapid access to tax refund money.

As used herein, the term "financial management system" includes, but is not limited to: computing system implemented, and/or online, personal tax preparation systems, packages, programs, modules, or applications; computing system implemented, and/or online, business tax preparation systems, packages, programs, modules, or applications; computing system implemented, and/or online, personal and/or business financial management systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filing or as developed later.

Specific examples of financial management systems include, but are not limited to: TurboTax™, available from Intuit, Inc. of Mountain View, Calif.; TurboTax™ online, available from Intuit, Inc. of Mountain View, Calif.; SnapTax™, available from Intuit, Inc. of Mountain View, Calif.; Quicken™, available from Intuit, Inc. of Mountain View, Calif.; Quicken On-line™, available from Intuit, Inc. of Mountain View, Calif.; QuickBooks™, available from Intuit, Inc. of Mountain View, Calif.; QuickBooks On-line™, available from Intuit, Inc. of Mountain View, Calif.; Mint™, available from Intuit, Inc. of Mountain View, Calif.; Microsoft Money™, previously available from Microsoft, Inc. of Redmond, Wash.; and/or various other financial management systems discussed herein, and/or known to those of skill in the art at the time of filing, and/or as developed after the time of filing.

In one embodiment, the user utilizes the financial management system, at least in part, to prepare the user's tax returns and tax related documents, and/or file the user's tax returns. Consequently, in one embodiment, the financial management system has access to user tax and/or refund data 126 associated with the user, and/or various other financial data associated with the user (not shown).

As seen in FIG. 1, provider computing system 120 typically includes a central processing unit (CPU) 124; a communications interface 122; and a memory 123.

In various embodiments, provider computing system 120 is a server computing system used to, in one embodiment, provide an on-line financial management system, such as O/L FM system 125, generate/accept and provide, analysis, verification, and/or approval of user ID data 131, receive and analyze user tax and/or refund data 126, and generate expedited refund data 105.

In one embodiment, memory 123 includes all, or part, of an online financial management system, O/L FM system 125, user ID data 131, analysis module 127, and expedited refund data 105.

In one embodiment, user tax and/or refund data 126 is processed by analysis module 127 to provide expedited refund data 105 and user ID data 131 under the direction of CPU 124.

As seen in FIG. 1, user computing system 150 typically includes a central processing unit (CPU) 154; a communications interface 152; and a memory 153.

In various embodiments, user computing system 150 is any computing system as discussed herein, and/or as known in the art at the time of filing, and/or as developed after the time of filing.

In various embodiments, user computing system 150, and memory 153, includes a computing system implemented, and/or stand alone, financial management system, such as C/S FM system 155.

In one embodiment, memory 153 includes all, or part, of user tax and/or refund data 126. In one embodiment, user tax and/or refund data 126 is provided to provider computing system 120 via communication interface 152 of user computing system 150, communications link/channel 163, and communication interface 122 of provider computing system 120.

In one embodiment, user tax and/or refund data 126 is processed by analysis module 127 to provide expedited refund data 105 and user ID data 131 under the direction of CPU 124.

In one embodiment, while using the financial management system, such as O/L FM system 125 or C/S FM system 155, the user is provided an expedited refund option through the financial management system, i.e., an offer is made to the user to inquire about obtaining expedited access to at least part of the user's tax refund money.

In one embodiment, the user's financial data associated with the financial management system is provided to one or more processors, such as CPU 154 and/or CPU 124, associated with one or more computing systems, such as provider computing system 120 and/or user computing system 150, and used to determine if the user is to be provided an expedited refund option through the financial management system, i.e., an initial screening is done to determine if the user will be eligible for expedited refund before the user is provided the expedited refund option.

In one embodiment, if the user is provided the expedited refund option, and the user selects the expedited refund option, user tax and/or refund data 126 associated with the user from the financial management system, such as the user's tax return documents and data, is provided to one or more processors, such as CPU 124 and/or CPU 154, associated with one or more computing systems, such as provider computing system 120 and/or user computing system 150, and analyzed by an analysis module, such as analysis module 127, to determine an expedited tax refund amount to be made available to the user, and included in expedited refund data 105.

In various embodiments, the determination regarding the expedited tax refund amount to be made available to the user is made by the one or processors, and analysis modules 127, based, at least in part, on user tax and/or refund data 126.

In various embodiments, the determination regarding the expedited tax refund amount to be made available to the user is made by the one or processors, and analysis module 127, based, at least in part, on user tax and/or refund data 126 and an analysis by analysis module 127 of other financial data associated with the user (not shown).

In various embodiments, the other financial data associated with the user includes, but is not limited to, any one or more of: the user's past tax filing documents and data; the user's financial transaction history; the user's credit worthiness; the user's total worth, etc.

In one embodiment, if a determination is made to provide the user an expedited tax refund amount, then the user is assigned a user ID, represented by user ID data 131, to be used in association with obtaining the expedited tax refund amount at refund issuing station 100.

In one embodiment, the user is informed of the expedited tax refund decision, provided at least part of expedited refund data 105, including the expedited tax refund amount to be provided, and provided user ID data 131. In one embodiment, the user is also provided instructions regarding the location and use of refund issuing station 100.

In one embodiment, the user then selects refund issuing station 100, enters his or her user ID data, i.e., user ID data 131, into user interface 101 of refund issuing station 100, and user ID data 131 is verified.

In one embodiment, refund issuing station 100 then obtains user account data associated with the user and expedited refund data 105 associated with the user, including data indicating the determined expedited tax refund amount to be made available to the user, from the financial management system, such as O/L FM system 125 and/or C/S FM system 120, and/or one or more computing systems implementing/providing the financial management system, such as provider computing system 120 and/or user computing system 150, and/or from a database (not shown) accessed via user ID data 131.

In one embodiment, once user ID data 131 and expedited refund data 105 are verified and provided to the refund issuing station 100, refund issuing station 100 provides the user with either a pre-paid debit or credit card, such as card/cash 109, having a balance equal to the determined expedited tax refund amount to be made available to the user or, in one embodiment, the user is provided the determined expedited tax refund amount to be made available to the user in cash.

In one embodiment, refund issuing station 100, provider computing systems 120, and user computing system 150, are part of a cloud computing environment.

Those of skill in the art will readily recognize that the components shown in FIG. 1, and their respective sub-components, are shown for illustrative purposes only and that architectures with more or fewer components can implement, and benefit from, one or more embodiments. Moreover, one or more components of refund issuing station 100, provider computing systems 120, and user computing system 150 may be located remotely from their respective system and accessed via communication channels 161 and/or 163.

As discussed in more detail below, in one embodiment, data associated with process for providing rapid access to tax refund money, and/or data associated with one or more users/consumers, is stored, in whole, or in part, in one or more memory systems, and/or cache memories, associated with one or more computing systems. As used herein, a memory refers to a volatile memory, a non-volatile memory, or any combination of the two.

Although process for providing rapid access to tax refund money is sometimes referred to herein, alternatively, as a process, an application, a module, a program, a component of a software system, a component of a software package, a component of a parent system, a plug-in, or a feature of a parent system, this terminology is illustrative only. In some embodiments, a process for providing rapid access to tax refund money is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 113, 124, and 154. In one embodiment, execution of a process by CPU 113, 124, or 154 results in the operations of an agent computer process (not shown) and/or a rule computer process (not shown).

In one embodiment, a process for providing rapid access to tax refund money is a computer application or process and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system or the medium may be removable and/or remote from the computing system.

Process

In accordance with one embodiment, a method and system for providing rapid access to tax refund money includes providing one or more refund issuing stations that can be accessed by users/taxpayers, in one embodiment, in relatively public locations. In one embodiment, the refund issuing stations include a user interface for obtaining user ID data associated with users/taxpayers and a card/cash dispenser for providing the users/taxpayers with a prepaid tax refund debit or credit card, or, in one embodiment, cash.

In one embodiment, a financial management system, such as, but not limited to, a computing system implemented or on-line tax preparation system, and/or one or more personal financial managements systems, is provided. In one embodiment, a user/taxpayer, i.e., a user, utilizes the financial management system, at least in part, to prepare the user's tax returns and tax related documents, and/or file the user's tax returns. Consequently, in one embodiment, the financial management system has access to user tax and/or refund data associated with the user.

In one embodiment, the user is provided an expedited refund option through the financial management system. In one embodiment, if the user selects the expedited refund option, the user tax and/or refund data associated with the user is analyzed to determine an expedited tax refund amount to be made available to the user. In various embodiments, the determination regarding the expedited tax refund amount to be made available to the user is made based, at least in part, on the user tax and/or refund data. In various embodiments, the determination regarding the expedited tax refund amount to be made available to the user is made based, at least in part, on the user tax and/or refund data and other financial data associated with the user which, in one embodiment, is obtained from the financial management system.

In one embodiment, if a determination is made to provide the user an expedited tax refund amount, then the user is assigned a user ID to be used in association with obtaining the expedited tax refund amount at one of the refund issuing stations.

In one embodiment, the user is informed of the decision to provide the expedited tax refund amount and provided instructions regarding the location and use of the refund issuing stations. In one embodiment, the user then selects a specific refund issuing station, enters his or her user ID data into the user interface of the selected refund issuing station, and the user ID data is verified. The selected refund issuing station is then provided expedited refund data associated with the user, including data indicating the determined expedited tax refund amount to be made available to the user, from the financial management system and/or one or more computing systems implementing/providing the financial management system.

In one embodiment, once the user ID data and the expedited refund data associated with the user are verified and provided to the selected refund issuing station, the selected refund issuing station provides the user with either a pre-paid debit or credit card having a balance equal to the determined expedited tax refund amount to be made available to the user or, in one embodiment, the user is provided the determined expedited tax refund amount to be made available to the user in cash.

FIG. 2 is a flow chart depicting a process for providing rapid access to tax refund money 200 in accordance with one embodiment. Process for providing rapid access to tax refund money 200 begins at ENTER OPERATION 201 of FIG. 2 and process flow proceeds to PROVIDE ONE OR MORE REFUND ISSUING STATIONS FOR DISPENSING PRE-PAID TAX REFUND CARDS AND/OR CASH OPERATION 203.

In one embodiment, at PROVIDE ONE OR MORE REFUND ISSUING STATIONS FOR DISPENSING PRE-PAID TAX REFUND CARDS AND/OR CASH OPERATION 203 one or more refund issuing stations that can be accessed by users/taxpayers are provided.

In one embodiment, at PROVIDE ONE OR MORE REFUND ISSUING STATIONS FOR DISPENSING PRE-PAID TAX REFUND CARDS AND/OR CASH OPERATION 203 one or more refund issuing stations that can be accessed by users/taxpayers are provided in relatively public locations such as grocery stores, convenience stores, gas stations, banks, or various other publically accessible locations.

In various embodiments, at PROVIDE ONE OR MORE REFUND ISSUING STATIONS FOR DISPENSING PRE-PAID TAX REFUND CARDS AND/OR CASH OPERATION 203 the refund issuing stations are provided as a capability/functionality added to existing systems such as ATM machines, CoinStar™ kiosks, Redbox™ stations, and/or any other service providing stations as discussed herein, and/or as known in the art/available at the time of filing, and or as developed/made available after the time of filing.

In one embodiment, the refund issuing stations of PROVIDE ONE OR MORE REFUND ISSUING STATIONS FOR DISPENSING PRE-PAID TAX REFUND CARDS AND/OR CASH OPERATION 203 include a user interface, such as a user interface screen, and/or one more user interface devices, such as, but not limited to, a keyboard, a mouse, a touchpad, voice recognition software, or any other mechanism or device for converting user actions into processor instructions and/or computer commands/actions. In one embodiment, the refund issuing station's user interface is used for obtaining/entering user ID data associated with the users.

In one embodiment, the one or more refund issuing stations of PROVIDE ONE OR MORE REFUND ISSUING STATIONS FOR DISPENSING PRE-PAID TAX REFUND CARDS AND/OR CASH OPERATION 203 include a card/cash dispenser for providing the users with a prepaid tax refund debit or credit card, or, in one embodiment, cash.

Herein, the term "pre-paid tax refund debit or credit card" includes any physical or virtual mechanism for providing a purchasing capability as discussed herein, and/or as known in the art/available at the time of filing, and or as developed/made available after the time of filing, and can include, but is not limited to: physical credit or debit cards; smart cards; key chain attachments; memory sticks; data in a memory; a mobile computing system, and/or data maintained by a mobile computing system; or any one of various other means for providing user account data.

In one embodiment, once one or more refund issuing stations that can be accessed by users/taxpayers are provided at PROVIDE ONE OR MORE REFUND ISSUING STATIONS FOR DISPENSING PRE-PAID TAX REFUND CARDS AND/OR CASH OPERATION 203, process flow proceeds to PROVIDE A FINANCIAL MANAGEMENT SYSTEM OPERATION 205.

In one embodiment, at PROVIDE A FINANCIAL MANAGEMENT SYSTEM OPERATION 205 a financial management system is provided that is used, at least in part, to prepare the user's tax returns and tax related documents, and/or file the user's tax returns.

In one embodiment, In one embodiment, at PROVIDE A FINANCIAL MANAGEMENT SYSTEM OPERATION 205 a financial management system, such as, but not limited to, a computing system implemented or on-line tax preparation system, is provided that is a parent system for, is part of, or is otherwise associated with, process for providing rapid access to tax refund money 200.

As used herein, the term "financial management system" includes, but is not limited to: computing system implemented, and/or online, personal tax preparation systems, packages, programs, modules, or applications; computing system implemented, and/or online, business tax preparation systems, packages, programs, modules, or applications; computing system implemented, and/or online, personal and/or business financial management systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filling or as developed later.

Specific examples of financial management systems include, but are not limited to: TurboTax™, available from Intuit, Inc. of Mountain View, Calif.; TurboTax™ online, available from Intuit, Inc. of Mountain View, Calif.; SnapTax™, available from Intuit, Inc. of Mountain View, Calif.; Quicken™, available from Intuit, Inc. of Mountain View, Calif.; Quicken On-line™, available from Intuit, Inc. of Mountain View, Calif.; QuickBooks™, available from Intuit, Inc. of Mountain View, Calif.; QuickBooks On-line™, available from Intuit, Inc. of Mountain View, Calif.; Mint™, available from Intuit, Inc. of Mountain View, Calif.; Microsoft Money™, previously available from Microsoft, Inc. of Redmond, Wash.; and/or various other financial management systems discussed herein, and/or known to those of skill in the art at the time of filing, and/or as developed after the time of filing.

In one embodiment, at PROVIDE A FINANCIAL MANAGEMENT SYSTEM OPERATION 205 a user/taxpayer, i.e., the user, utilizes the financial management system, at least in part, to prepare the user's tax returns and tax related documents, and/or file the user's tax returns. Consequently, in one embodiment, the financial management system has access to user tax and/or refund data associated with the user, and/or various other financial data associated with the user.

In one embodiment, once a financial management system is provided at PROVIDE A FINANCIAL MANAGEMENT SYSTEM OPERATION 205, process flow proceeds to OBTAIN USER TAX AND/OR REFUND DATA FROM THE FINANCIAL MANAGEMENT SYSTEM OPERATION 207.

In one embodiment, at OBTAIN USER TAX AND/OR REFUND DATA FROM THE FINANCIAL MANAGEMENT SYSTEM OPERATION 207 process for providing rapid access to tax refund money 200 obtains user tax and/or refund data associated with the user, and/or various other financial data associated with the user, from the financial management system of PROVIDE A FINANCIAL MANAGEMENT SYSTEM OPERATION 205.

In one embodiment, at OBTAIN USER TAX AND/OR REFUND DATA FROM THE FINANCIAL MANAGEMENT SYSTEM OPERATION 207 process for providing rapid access to tax refund money 200 obtains user tax and/or refund data associated with the user, and/or various other financial data associated with the user, from the financial management system of PROVIDE A FINANCIAL MANAGEMENT SYSTEM OPERATION 205 using any means, method, process, or procedure for obtaining and/or transferring data, as discussed herein, and/or as known/available in the art at the time of filing, and/or as developed/made available at the time of filing.

In one embodiment, once process for providing rapid access to tax refund money 200 obtains user tax and/or refund data associated with the user, and/or various other financial data associated with the user, from the financial management system of PROVIDE A FINANCIAL MANAGEMENT SYSTEM OPERATION 205 at OBTAIN USER TAX AND/OR REFUND DATA FROM THE FINANCIAL MANAGEMENT SYSTEM OPERATION 207, process flow proceeds to THE USER SELECTS AN EXPEDITED REFUND OPTION THROUGH THE FINANCIAL MANAGEMENT SYSTEM OPERATION 209.

In one embodiment, at THE USER SELECTS AN EXPEDITED REFUND OPTION THROUGH THE FINANCIAL MANAGEMENT SYSTEM OPERATION 209 the user is provided an expedited refund option through the financial management system of PROVIDE A FINANCIAL MANAGEMENT SYSTEM OPERATION 205 and the user selects the expedited refund option through the financial management system.

In one embodiment, at THE USER SELECTS AN EXPEDITED REFUND OPTION THROUGH THE FINANCIAL MANAGEMENT SYSTEM OPERATION 209 while using the financial management system, the user is provided an expedited refund option through the financial management system, i.e., an offer is made to the user to inquire about obtaining expedited access to at least part of the user's tax refund money.

In one embodiment, at THE USER SELECTS AN EXPEDITED REFUND OPTION THROUGH THE FINANCIAL MANAGEMENT SYSTEM OPERATION 209 the user's financial data associated with the financial management system of OBTAIN USER TAX AND/OR REFUND DATA FROM THE FINANCIAL MANAGEMENT SYSTEM OPERATION 207 is provided to one or more processors associated with one or more computing systems and analyzed to determine if the user is to be provided an expedited refund option through the financial management system, i.e., an initial screening is done to determine if the user will be eligible for expedited refund before the user is provided the expedited refund option.

In one embodiment, once the user is provided an expedited refund option through the financial management system of PROVIDE A FINANCIAL MANAGEMENT SYSTEM OPERATION 205 at THE USER SELECTS AN EXPEDITED REFUND OPTION THROUGH THE FINANCIAL MANAGEMENT SYSTEM OPERATION 209, and the user selects the expedited refund option through the financial management system, process flow proceeds to DETERMINE AN EXPEDITED REFUND ELIGIBLE AMOUNT FOR THE USER AND GENERATE EXPEDITED REFUND DATA FOR THE USER OPERATION 211.

In one embodiment, at DETERMINE AN EXPEDITED REFUND ELIGIBLE AMOUNT FOR THE USER AND GENERATE EXPEDITED REFUND DATA FOR THE USER OPERATION 211 the user tax and/or refund data associated with the user of OBTAIN USER TAX AND/OR REFUND DATA FROM THE FINANCIAL MANAGEMENT SYSTEM OPERATION 207 is analyzed to determine an expedited tax refund amount to be made available to the user.

In one embodiment, at DETERMINE AN EXPEDITED REFUND ELIGIBLE AMOUNT FOR THE USER AND GENERATE EXPEDITED REFUND DATA FOR THE USER OPERATION 211 the user tax and/or refund data associated with the user from the financial management system, such as the user's tax return documents and data, is provided to one or more processors associated with one or more computing systems and analyzed to determine an expedited tax refund amount to be made available to the user.

In one embodiment, at DETERMINE AN EXPEDITED REFUND ELIGIBLE AMOUNT FOR THE USER AND GENERATE EXPEDITED REFUND DATA FOR THE USER OPERATION 211 the user tax and/or refund data associated with the user from the financial management system, and/or any other financial data associated with the user, is provided to one or more processors associated with the refund issuing station, i.e., processors that are at the same location as, or are part of, the refund issuing station.

In one embodiment, at DETERMINE AN EXPEDITED REFUND ELIGIBLE AMOUNT FOR THE USER AND GENERATE EXPEDITED REFUND DATA FOR THE USER OPERATION 211 the user tax and/or refund data associated with the user from the financial management system, and/or any other financial data associated with the user, is provided to one or more processors associated with one or more computing systems, such as a provider computing system, that are in a separate location from the refund issuing station via one or more communications links/channels.

In various embodiments, the communications links/channels can be, but is not limited to: a mobile communication link, such as a mobile phone link; a land-line phone link; a cable-based communications link; a satellite communications link; the Internet, or other network; and/or any other communications link, or combination of communications links, as discussed herein, and/or as known in the art at the time of filing, and/or as developed after the time of filing.

In various embodiments, at DETERMINE AN EXPEDITED REFUND ELIGIBLE AMOUNT FOR THE USER AND GENERATE EXPEDITED REFUND DATA FOR THE USER OPERATION 211 the determination regarding the expedited tax refund amount to be made available to the user is made by the one or processors based, at least in part, on the user tax and/or refund data associated with the user from the financial management system, such as the user's tax return documents and data.

In various embodiments, at DETERMINE AN EXPEDITED REFUND ELIGIBLE AMOUNT FOR THE USER AND GENERATE EXPEDITED REFUND DATA FOR THE USER OPERATION 211 the determination regarding the expedited tax refund amount to be made available to the user is made by the one or processors based, at least in part, on the user tax and/or refund data associated with the user from the financial management system, such as the user's tax return documents and data, and an analysis other financial data associated with the user which, in one embodiment, is obtained from one or more financial management systems.

In various embodiments, the other financial data associated with the user includes, but is not limited to, any one or more of: the user's past tax filing documents and data; the user's financial transaction history; the user's credit worthiness; the user's total worth, etc.

In one embodiment, once the user tax and/or refund data associated with the user of OBTAIN USER TAX AND/OR REFUND DATA FROM THE FINANCIAL MANAGEMENT SYSTEM OPERATION 207 is analyzed to determine an expedited tax refund amount to be made available to the user at DETERMINE AN EXPEDITED REFUND ELIGIBLE AMOUNT FOR THE USER AND GENERATE EXPEDITED REFUND DATA FOR THE USER OPERATION 211, process flow proceeds to ASSIGN USER ID DATA AND THE EXPEDITED REFUND DATA TO THE USER OPERATION 213.

In one embodiment, at ASSIGN USER ID DATA AND THE EXPEDITED REFUND DATA TO THE USER OPERATION 213 if a determination is made to provide the user an expedited tax refund amount at DETERMINE AN EXPEDITED REFUND ELIGIBLE AMOUNT FOR THE USER AND GENERATE EXPEDITED REFUND DATA FOR THE USER OPERATION 211, then the user is assigned a user ID to be used in association with obtaining the expedited tax refund amount at one of the refund issuing stations.

In various embodiments, the user ID data of ASSIGN USER ID DATA AND THE EXPEDITED REFUND DATA TO THE USER OPERATION 213 can be, but is not limited to: the user's ID associated/used with the financial management system; an ID or PIN selected by the user; an ID or PIN selected by the provider of the method and system for providing rapid access to tax refund money; or any other form of user ID, as discussed herein, and/or as known/available in the art at the time of filing, and/or as developed/made available after the time of filing.

In one embodiment, at ASSIGN USER ID DATA AND THE EXPEDITED REFUND DATA TO THE USER OPERATION 213 the user is informed of the expedited tax refund decision, and the expedited tax refund amount to be provided of DETERMINE AN EXPEDITED REFUND ELIGIBLE AMOUNT FOR THE USER AND GENERATE EXPEDITED REFUND DATA FOR THE USER OPERATION 211, and the user ID data for the user. In one embodiment, the user is also provided instructions regarding the location and use of the refund issuing stations.

In one embodiment, once the user is assigned user ID data to be used in association with obtaining the expedited tax refund amount at one of the refund issuing stations at ASSIGN USER ID DATA AND THE EXPEDITED REFUND DATA TO THE USER OPERATION 213, process flow proceeds to THE USER SELECTS A REFUND ISSUING STATION AND PROVIDES THE USER ID DATA OPERATION 215.

In one embodiment, at THE USER SELECTS A REFUND ISSUING STATION AND PROVIDES THE USER ID DATA OPERATION 215 the user selects a specific one of the refund issuing stations of PROVIDE ONE OR MORE REFUND ISSUING STATIONS FOR DISPENSING PRE-PAID TAX REFUND CARDS AND/OR CASH OPERATION 203 and enters his or her user ID data into the user interface of the selected refund issuing station.

In one embodiment, once the user is informed of the decision to provide the expedited tax refund amount and provided instructions regarding the location and use of the refund issuing stations at ASSIGN USER ID DATA AND THE EXPEDITED REFUND DATA TO THE USER OPERATION 213, the user then selects a specific refund issuing station, enters his or her user ID data into the user interface of the selected refund issuing station, and the user ID data is verified at THE USER SELECTS A REFUND ISSUING STATION AND PROVIDES THE USER ID DATA OPERATION 215.

In one embodiment, once the user selects a specific one of the refund issuing stations of PROVIDE ONE OR MORE REFUND ISSUING STATIONS FOR DISPENSING PRE-PAID TAX REFUND CARDS AND/OR CASH OPERATION 203 and enters his or her user ID data into the user interface of the selected refund issuing station at THE USER SELECTS A REFUND ISSUING STATION AND PROVIDES THE USER ID DATA OPERATION 215, process flow proceeds to PROVIDE THE SELECTED REFUND ISSUING STATION CONFIRMATION OF THE USER ID DATA ENTERED AND THE EXPEDITED REFUND DATA FOR THE USER OPERATION 217.

In one embodiment, at PROVIDE THE SELECTED REFUND ISSUING STATION CONFIRMATION OF THE USER ID DATA ENTERED AND THE EXPEDITED REFUND DATA FOR THE USER OPERATION 217 the selected refund issuing station is provided expedited refund data associated with the user, including data indicating the determined expedited tax refund amount to be made available to the user, from the financial management system and/or one or more computing systems implementing/providing the financial management system.

In one embodiment, at PROVIDE THE SELECTED REFUND ISSUING STATION CONFIRMATION OF THE USER ID DATA ENTERED AND THE EXPEDITED REFUND DATA FOR THE USER OPERATION 217 the refund issuing station obtains user account data associated with the user and expedited refund data associated with the user, including data indicating the determined expedited tax refund amount to be made available to the user, from the financial management system and/or one or more computing systems implementing/providing the financial management system, and/or from a database accessed via the user ID data.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, at PROVIDE THE SELECTED REFUND ISSUING STATION CONFIRMATION OF THE USER ID DATA ENTERED AND THE EXPEDITED REFUND DATA FOR THE USER OPERATION 217 the refund issuing station obtains user account data associated with the user and expedited refund data associated with the user, including data indicating the determined expedited tax refund amount to be made available to the user, from the financial management system and/or one or more computing systems implementing/providing the financial management system, and/or from a database accessed via the user ID data via any communications link/channel, as discussed herein, and/or as known/available in the art at the time of filing, and/or as developed/made available after the time of filing.

In one embodiment, once the selected refund issuing station is provided expedited refund data associated with the user, including data indicating the determined expedited tax refund amount to be made available to the user, from the financial management system and/or one or more computing systems implementing/providing the financial management system at PROVIDE THE SELECTED REFUND ISSUING STATION CONFIRMATION OF THE USER ID DATA ENTERED AND THE EXPEDITED REFUND DATA FOR THE USER OPERATION 217, process flow proceeds to PROVIDE THE USER A PRE-PAID REFUND CARD, OR CASH, FROM THE REFUND ISSUING STATION OPERATION 219.

In one embodiment, at PROVIDE THE USER A PRE-PAID REFUND CARD, OR CASH, FROM THE REFUND ISSUING STATION OPERATION 219 the selected refund issuing station of THE USER SELECTS A REFUND ISSUING STATION AND PROVIDES THE USER ID DATA OPERATION 215 provides the user with either a pre-paid debit or credit card having a balance equal to the determined expedited tax refund amount to be made available to the user or, in one embodiment, the user is provided the determined expedited tax refund amount to be made available to the user in cash.

In one embodiment, once the user ID data and the expedited refund data associated with the user are verified and provided to the selected refund issuing station at PROVIDE THE SELECTED REFUND ISSUING STATION CONFIRMATION OF THE USER ID DATA ENTERED AND THE EXPEDITED REFUND DATA FOR THE USER OPERATION 217, the selected refund issuing station provides the user with either a pre-paid debit or credit card having a balance equal to the determined expedited tax refund amount to be made available to the user or, in one embodiment, the user is provided the determined expedited tax refund amount to be made available to the user in cash at PROVIDE THE USER A PRE-PAID REFUND CARD, OR CASH, FROM THE REFUND ISSUING STATION OPERATION 219.

In one embodiment, after the selected refund issuing station provides the user with either a pre-paid debit or credit card having a balance equal to the determined expedited tax refund amount to be made available to the user or, in one embodiment, the user is provided the determined expedited tax refund amount to be made available to the user in cash at PROVIDE THE USER A PRE-PAID REFUND CARD, OR CASH, FROM THE REFUND ISSUING STATION OPERATION 219 the user's tax refund check is received and the balance of the tax refund check amount is also added to the pre-paid debit or credit card balance.

In one embodiment, at the time the funds are made available to the user through the pre-paid tax refund debit or credit card at PROVIDE THE USER A PRE-PAID REFUND CARD, OR CASH, FROM THE REFUND ISSUING STATION OPERATION 219, the user is also provided one or more Card Linked Offers (CLOs) whereby special bonuses, offers, and/or balance additions/multipliers are provided if the user uses the pre-paid tax refund debit or credit card balance in qualifying ways.

For instance, as one illustrative example, in one embodiment, at the time the funds are made available to the user through the pre-paid tax refund debit or credit card, the user is informed that if the user uses the pre-paid tax refund debit or credit card to make specific purchases, or purchases with a defined merchant, the balance on pre-paid tax refund debit or credit card will be increased by 10%.

In some cases, the CLOs will require tracking the user's purchases at PROVIDE THE USER A PRE-PAID REFUND CARD, OR CASH, FROM THE REFUND ISSUING STATION OPERATION 219. In various embodiments, this task can be accomplished using the pre-paid tax refund debit or credit card. In various embodiments, tracking the user's purchases can be accomplished using various merchant point-of-sale systems, or using any mechanism for tracking consumer purchases as discussed herein, known at the time of filing, or as developed thereafter.

In one embodiment, once the selected refund issuing station of THE USER SELECTS A REFUND ISSUING STATION AND PROVIDES THE USER ID DATA OPERATION 215 provides the user with either a pre-paid debit or credit card having a balance equal to the determined expedited tax refund amount to be made available to the user or, in one embodiment, the user is provided the determined expedited tax refund amount to be made available to the user in cash at PROVIDE THE USER A PRE-PAID REFUND CARD, OR CASH, FROM THE REFUND ISSUING STATION OPERATION 219, process flow proceeds to EXIT OPERATION 230. In one embodiment, at EXIT OPERATION 230 process for providing rapid access to tax refund money 200 is exited to await new data and/or a newly detected trigger event.

Using process for providing rapid access to tax refund money 200, taxpayers, including non-bank affiliated taxpayers, are provided a simple and inexpensive way to quickly and conveniently access at least a portion of their tax refund money after filing their tax returns. Consequently, using process for providing rapid access to tax refund money 200, a significant economic burden, and considerable inconvenience, currently faced by many taxpayers is removed, along with a significant barrier to the flow of commerce.

As discussed in more detail above, using the above embodiments, with little or no modification and/or healthcare consumer input, there is considerable flexibility, adaptability, and opportunity for customization to meet the specific needs of various healthcare consumers under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "detecting", "inserting", "posting", "sending", "obtaining", "establishing", "posting", "intercepting", "accessing", "scanning", "transforming", "linking", "verifying", "monitoring", "browsing", "updating", "associating", "analyzing", "defining", "storing", "saving", "displaying", "implementing", "performing", "creating", "assigning", "estimating", "entering", "modifying", "categorizing", "providing", "processing", "accessing", "selecting", "scheduling", "creating", "using", "comparing", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for providing rapid access to tax refund money comprising:
   providing a refund issuing station, the refund issuing station including a user interface and a pre-paid debit or credit card dispensing capability;
   a financial management system, the financial management system having access to user tax and/or refund data associated with a user;
   providing the user an expedited refund option through the financial management system;
   the user selecting the expedited refund option through the financial management system;
   obtaining at least part of the user tax and/or refund data associated with the user from the financial management system;
   using one or more processors to analyze the user tax and/or refund data to determine an expedited tax refund amount to be made available to the user;
   responsive to determining an expedited refund amount to be made available to the user, assigning user ID data to the user;
   providing the user the user ID data and data indicating the determined expedited tax refund amount to be made available to the user;
   the user selecting one of the refund issuing stations;
   the user providing the selected refund issuing station the user ID data;
   providing the selected refund issuing station expedited refund data, the expedited refund data including data indicating the determined expedited tax refund amount to be made available to the user; and
   the refund issuing station providing the user a pre-paid tax refund debit or credit card having a pre-paid tax refund debit or credit card balance representing the determined expedited tax refund amount to be made available to the user.

2. The method for providing rapid access to tax refund money of claim 1, wherein;
   the pre-paid tax refund debit or credit card is a pre-paid tax refund debit or credit card selected from the group of pre-paid tax refund debit or credit cards consisting of:
   a physical credit or debit card;
   a smart card;
   a key chain attachment;
   a memory;
   a memory stick;
   data in a memory;
   a mobile computing system; and
   data maintained by a mobile computing system.

3. The method for providing rapid access to tax refund money of claim 1, wherein;
   the refund issuing station is located in a publically accessible area.

4. The method for providing rapid access to tax refund money of claim 1, wherein;
   the refund issuing station is included as part of an existing system selected from the group of existing systems consisting of:
   an ATM machine;
   a CoinStar™ kiosk; and
   a Redbox™ station.

5. The method for providing rapid access to tax refund money of claim 1, wherein;
   the financial management system is a financial management system used at least in part, to prepare the user's tax returns and tax related documents, and/or file the user's tax returns.

6. The method for providing rapid access to tax refund money of claim 1, wherein;
   the financial management system is a tax preparation system.

7. The method for providing rapid access to tax refund money of claim 1, wherein;
   prior to providing the user an expedited refund option through the financial management system, one or more processors are used to analyze the user tax and/or refund data to determine if the user will be provided an expedited refund option.

8. The method for providing rapid access to tax refund money of claim 1, wherein;

in addition to using one or more processors to analyze the user tax and/or refund data to determine an expedited tax refund amount to be made available to the user, the one or more processors are used to analyze other financial data associated with the user to determine the expedited tax refund amount to be made available to the user.

9. The method for providing rapid access to tax refund money of claim 8, wherein;

the other financial data associated with the user is obtained from one or more financial management systems.

10. The method for providing rapid access to tax refund money of claim 8, wherein;

at least part of the other financial data associated with the user is selected from the group of financial data associated with the user consisting of:

the user's past tax filing documents and data;
the user's financial transaction history;
the user's credit worthiness; and
the user's total worth.

11. A system for providing rapid access to tax refund money comprising:

a refund issuing station, the refund issuing station including a user interface and a pre-paid debit or credit card dispensing capability;

a financial management system, the financial management system having access to user tax and/or refund data associated with a user; and one or more processors, the one or more processors executing instructions associated with a process for providing rapid access to tax refund money, the process for providing rapid access to tax refund money including:

providing the user an expedited refund option through the financial management system;

the user selecting the expedited refund option through the financial management system;

obtaining at least part of the user tax and/or refund data associated with the user from the financial management system;

using the one or more processors to analyze the user tax and/or refund data to determine an expedited tax refund amount to be made available to the user;

responsive to determining an expedited refund amount to be made available to the user, assigning user ID data to the user;

providing the user the user ID data and data indicating the determined expedited tax refund amount to be made available to the user;

the user selecting one of the refund issuing stations;

the user providing the selected refund issuing station the user ID data;

providing the selected refund issuing station expedited refund data, the expedited refund data including data indicating the determined expedited tax refund amount to be made available to the user; and the refund issuing station providing the user a pre-paid tax refund debit or credit card having a pre-paid tax refund debit or credit card balance representing the determined expedited tax refund amount to be made available to the user.

12. The system for providing rapid access to tax refund money of claim 11, wherein;

the pre-paid tax refund debit or credit card is a pre-paid tax refund debit or credit card selected from the group of pre-paid tax refund debit or credit cards consisting of:

a physical credit or debit card;
a smart card;
a key chain attachment;
a memory;
a memory stick;
data in a memory;
a mobile computing system; and
data maintained by a mobile computing system.

13. The system for providing rapid access to tax refund money of claim 11, wherein;

the refund issuing station is located in a publically accessible area.

14. The system for providing rapid access to tax refund money of claim 11, wherein;

the refund issuing station is included as part of an existing system selected from the group of existing systems consisting of:

an ATM machine;
a CoinStar™ kiosk; and
a Redbox™ station.

15. The system for providing rapid access to tax refund money of claim 11, wherein;

the financial management system is a financial management system used at least in part, to prepare the user's tax returns and tax related documents, and/or file the user's tax returns.

16. The system for providing rapid access to tax refund money of claim 11, wherein;

the financial management system is a tax preparation system.

17. The system for providing rapid access to tax refund money of claim 11, wherein;

prior to providing the user an expedited refund option through the financial management system, the one or more processors are used to analyze the user tax and/or refund data to determine if the user will be provided an expedited refund option.

18. The system for providing rapid access to tax refund money of claim 11, wherein;

in addition to using the one or more processors to analyze the user tax and/or refund data to determine an expedited tax refund amount to be made available to the user, the one or more processors are used to analyze other financial data associated with the user to determine the expedited tax refund amount to be made available to the user.

19. The system for providing rapid access to tax refund money of claim 18, wherein;

the other financial data associated with the user is obtained from one or more financial management systems.

20. The system for providing rapid access to tax refund money of claim 18, wherein;

at least part of the other financial data associated with the user is selected from the group of financial data associated with the user consisting of:

the user's past tax filing documents and data;
the user's financial history;
the user's credit worthiness; and
the user's total worth.

* * * * *